United States Patent

[11] 3,604,260

| [72] | Inventor | Robert D. Ogg<br>Portland, Maine |
|---|---|---|
| [21] | Appl. No. | 887,995 |
| [22] | Filed | Dec. 24, 1969 |
| [45] | Patented | Sept. 14, 1971 |
| [73] | Assignee | The Eastern Company |

[54] LOGGING APPARATUS FOR VESSELS
10 Claims, 6 Drawing Figs.

[52] U.S. Cl. .................................................... 73/181
[51] Int. Cl. ........................................................ G01c 21/00
[50] Field of Search .......................................... 73/181,
186, 185, 183, 184, 187; 324/70 CG; 235/151.32

[56] References Cited
UNITED STATES PATENTS
3,433,065  3/1969  Mergler ........................ 73/187

*Primary Examiner*—Donald O. Woodiel
*Attorney*—Eckhoff and Hoppe

ABSTRACT: Apparatus for indicating the distance travelled by a vessel comprising a counter that operates cyclically and for periods of time during each cycle which is a linear function of the velocity of the vessel. The counter is operated with a control circuit which is energized in response to an electrical output signal that is substantially proportional and linear to the velocity of a vessel and a second electrical signal that varies linearly with time between two set values.

INVENTOR.
ROBERT D. OGG

INVENTOR.
ROBERT D. OGG

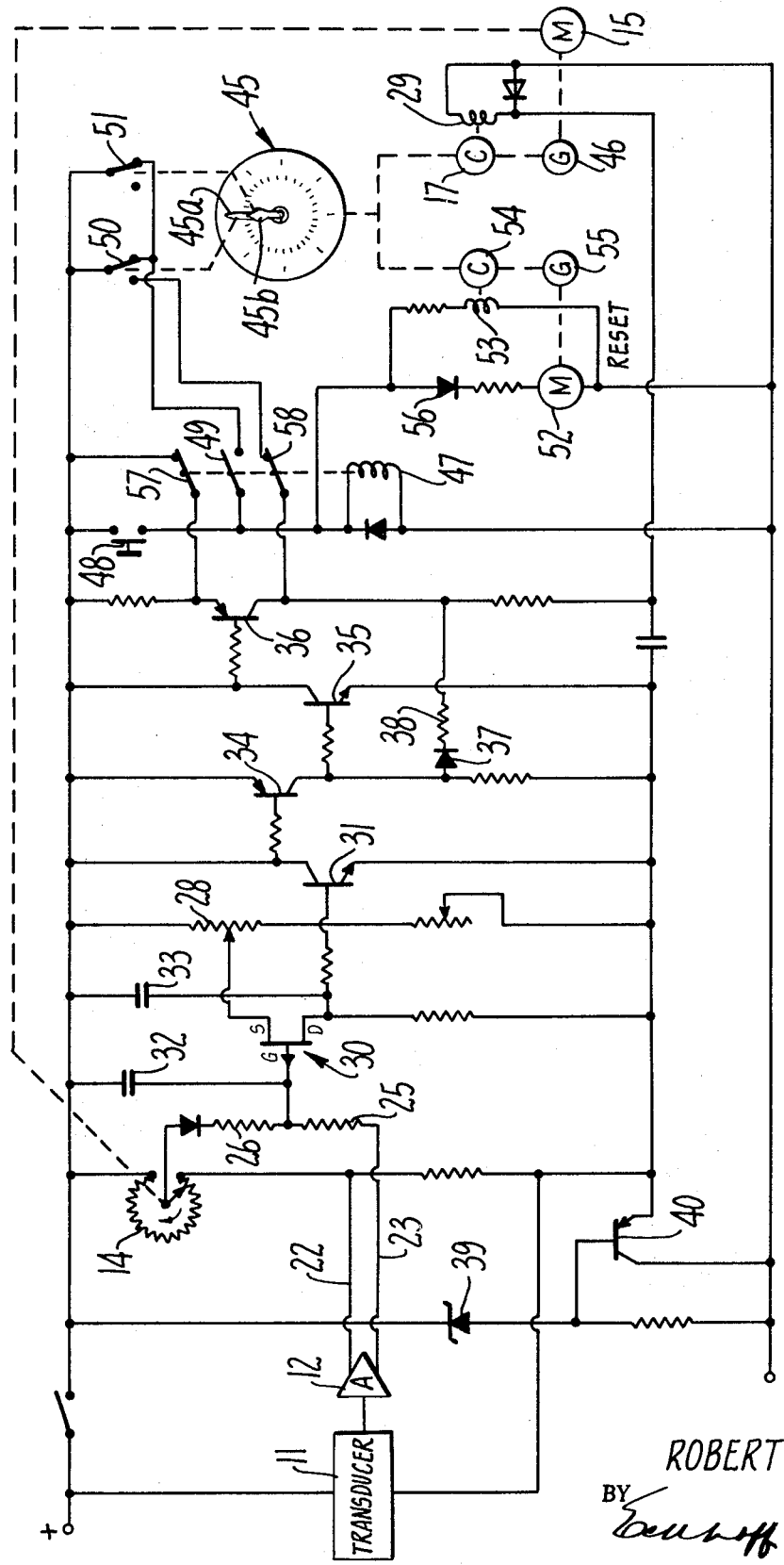

LOGGING APPARATUS FOR VESSELS

This invention relates generally to a log for indicating or registering the distance travelled by a vessel. The invention particularly relates to a novel apparatus for logging distances with reference to an electrical output signal that is substantially proportional and linear to the velocity of the vessel.

The present invention is of particular utility in logging the distances travelled by a yacht or small ships. Although such devices are generally known, most are either too expensive for general use or are unreliable.

In brief, the present invention provides apparatus for operating a counter cyclically at a relatively uniform rate of speed but for time periods each cycle which are proportional to the instantaneous linear velocity of the vessel. Accordingly, as the speed of the vessel increases the period of time during which the counter is operated each cycle becomes greater, while a lessening of speed results in a shorter period of counter operation.

It is one object of the present invention to provide a device which may be economically manufactured and yet has a great deal of accuracy over a range of velocities.

Another object is to provide apparatus of the kind described that is suitable for adaptation and use on relatively small vessels.

A further object of the invention is to provide a logging apparatus of the kind described comprising a counter which operates cyclically at a uniform rate but for periods of time during each cycle which are linear function of the vessel's velocity.

A still further object of the present invention is to provide apparatus for automatically logging the distance travelled by a vessel comprising means for producing an electrical output signal that is substantially proportional and linear to the velocity of a vessel, a second electrical signal that varies linearly with time between two set values, means for comparing the instantaneous values of said second electrical signal with the instantaneous value of said output signal, a counter, means for operating said counter including a control circuit, and means for energizing said control circuit with reference to the compared values of the two signals.

Other objects of this invention will become apparent in view of the following detailed description and the accompanying drawings.

In the drawings forming a part of this application and in which like parts are identified by like reference numerals throughout the same, FIG. 1 is a diagrammatic illustration of a small vessel equipped with logging apparatus constructed in accordance with the present invention;

FIG. 6 is a schematic diagram of an electrical circuit similar to that shown in FIG. 5 but having a different form of counting device and additional controls.

Figure 1:
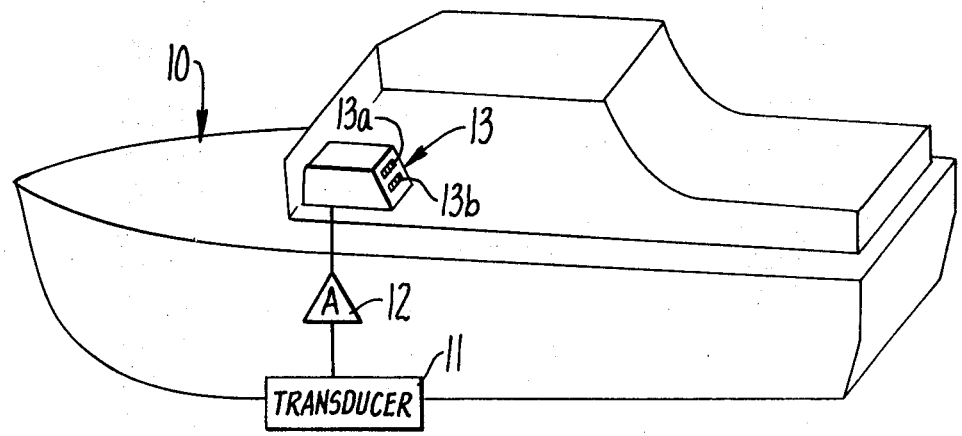

Referring to FIG. 1, the present invention is especially adapted for use on a small vessel 10 having a transducer 11 that produces an electrical signal as a function of the vessel's velocity. Transducer 11 may be any one of several conventional types such as propeller driven devices and pressure transducers. Conveniently, the transducer may be an existing complement of the vessel such as that used to indicate speed. If, however, the output signal of the transducer is not linearly proportional to velocity, the signal is converted to one which is linear by an amplifier-modifier 12. The output signal of the amplifier is then passed on to a logging computer 13 constructed in accordance with the present invention.

Logging computer 13 may be made with electrical circuitry of varying complexity as schematically illustrated in FIGS. 3, 4, 5 and 6. In any event, preferred embodiments of the invention include a pair of display counters 13a and 13b one for indicating the long trip totals and the other for indicating shorter distances, such as the distance between buoys.

Figure 2:
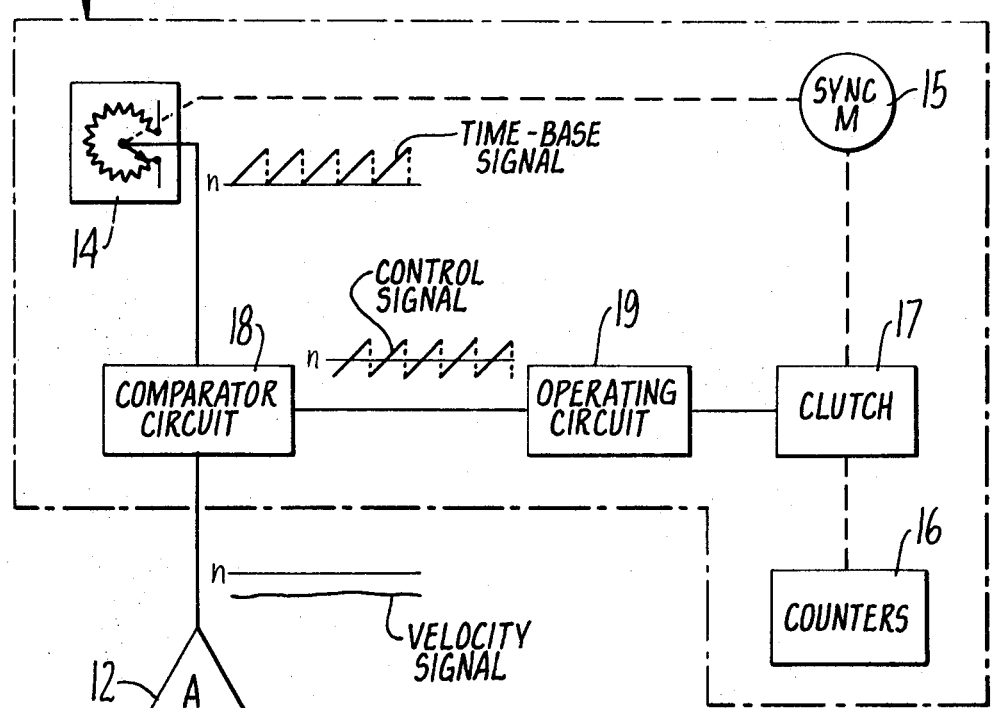
FIG. 2 is a diagram that schematically illustrates interrelationships of various functional components used with this invention.

Referring more particularly to FIG. 2, various functional components utilized in each of the operating circuits are shown. Transducer 11 (which we will assume produces a signal that is an exponential function of velocity) supplies an electrical signal to amplifier—modifier 12 which converts the signal to one that is a linear function of velocity. This velocity signal is then compared against a time-base signal produced with potentiometer 14, a signal that varies linearly with time between two set values. A synchronous motor 15 drives the wiper contact of potentiometer 14 and also operates a pair of counter 16 whenever a clutch 17 is engaged. It will be further apparent that the signals of amplifier-modifier 12 and potentiometer 14 are brought together and compared in a comparator circuit 18 that provides a control signal for energizing and operating circuit 19 including a coil for clutch 17. In each of the circuitry embodiments hereinafter described the operating circuit comprises a gate having a control grid connected to the control signal of the comparator circuit.

Figure 3:
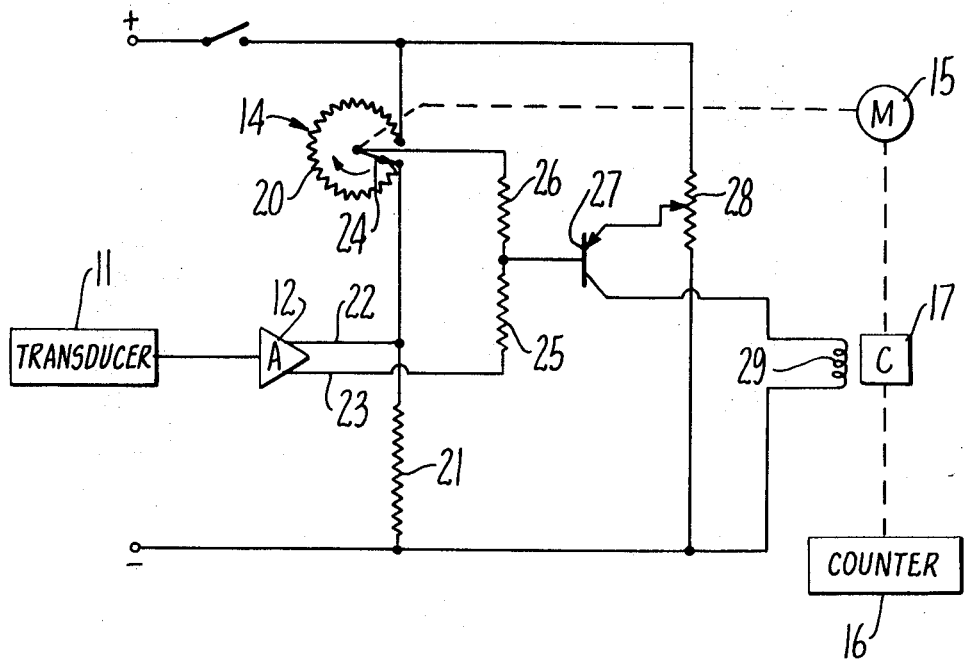
FIG. 3 is a schematic diagram of a simple electrical circuit which may be used in practicing the present invention.

FIG. 3 illustrates a simple electric circuit for connecting the various components illustrated in FIG. 2 in one manner contemplated by this invention. As shown, resistance element 20, forming part of potentiometer 14, is connected in series with a resistance 21 of equal value, both resistant being connected between a source of fixed DC voltage as provided by a battery. Amplifier-modifier 12 is connected at a point intermediate resistances 20 and 21 by a line 22 and produces an output signal in line 23 that varies from $n$ (a value halfway between the plus and minus voltage levels of the voltage source) to lesser voltage levels. Thus, when the boat has no velocity the velocity signal will be $n$ and as the boat increases in speed the voltage level of the velocity signal will decrease linearly with velocity. Further, the voltage output signal of amplifier-modifier 12 is adjusted to reach the full minus value of the DC voltage source when the boat gains maximum speed.

The time-base signal of potentiometer 14, it will be noted, depends on the instantaneous position of its contact wiper 24 as it moves across resistance 20. Inasmuch as the resistance 20 is connected across a source of fixed voltage the time-base signal will vary between two set values, the lower value being equal to $n$. It will be further apparent that motor 15 rotates contact 24 in a clockwise direction and, therefore, the time-base signal increases in value as the contact moves across the resistance and then drops back to the value $n$.

Potentiometer 14 is preferably of the type provided with a full 360° of resistance and having a contact or wiper that may be continuously rotated as by a synchronous motor. It is contemplated, however, that the resistance element 20 may be substantially less than 360° as is provided in the more commercially available potentiometers having only 354° of resistance. This difference will of course introduce certain inaccuracies unless compensated with circuitry of greater complexity as hereinafter described.

The velocity and time-base signals derived with the circuit of FIG. 2 are compared across a pair of resistors 25 and 26, and the resulting control signal is then applied to the base of a transistor 27. The emitter of transistor 27 is connected to the movable contact of an adjustable resistance 28, the end of the resistance being connected across the fixed voltage source. The collector of transistor 27 is connected in series with a coil 29 that operates clutch 17.

The movable contact of resistance 28 is positioned such that transistor 27 is turned on momentarily when both the velocity signal and the time-base signal are at voltage $n$. Thereafter, and when the boat is in motion, transistor 27 will stay on for that period of time in which it takes the contact 24 to reach a position on resistance 20 where its voltage level relative to $n$ is equal but opposite to the voltage level of the velocity signal emitted from amplifier-modifier 12. It will be further apparent that as long as transistor 27 is on and conducting, coil 29 will keep the clutch 17 engaged and counter 16 will be driven by motor 15. Thus, counter 16 is operated for a period of time during each pass of wiper 24 over resistance 20, and the period of operation will be a linear function of the velocity of the vessel.

The circuit of FIG. 3, while operable, has the inherent problem that input information is loaded through transistor 27. This problem may be overcome with the circuit shown in FIG. 4 wherein transistor 27 is replaced by a field effect transistor (FET) 30 which does not load the input information and hence gives a much more accurate output. Transistor 30, as indicated, operates a following transistor 31 having its emitter and collector connected in series with coil 29. Thus, the circuit of FIG. 4 operates in essentially the same manner as that of FIG. 3, the counter 16 being operated for a period of time that is in proportion to the velocity of the vessel.

Figure 4:
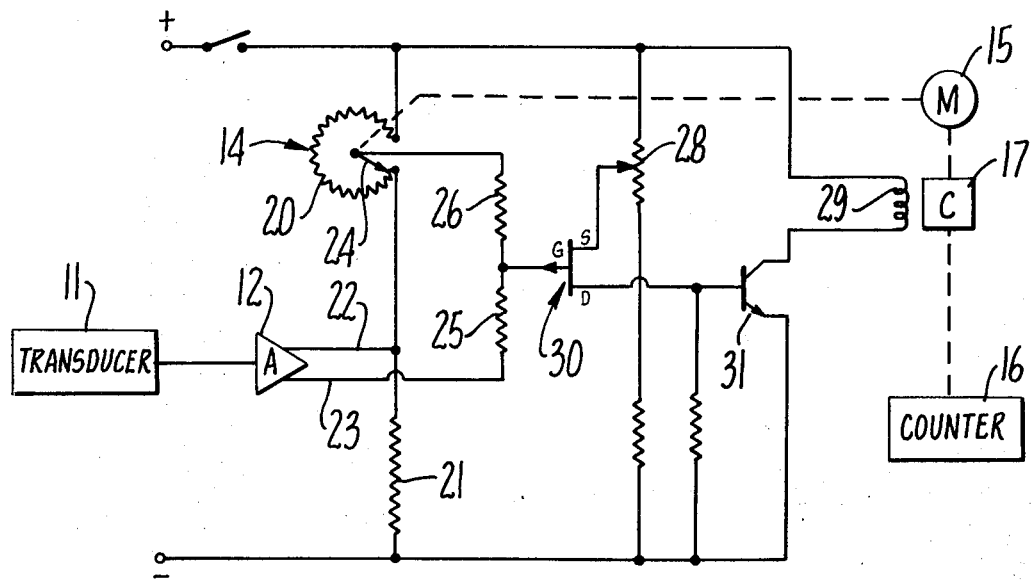
FIG. 4 is a second schematic diagram of another simple form of electrical circuitry for practicing this invention.

As indicated above, the more economical grades of potentiometers have resistance windings of 354° rather than an exact 360° and if such devices are used in the circuits of FIGS. 3 and 4 small percentage errors are to be expected. These errors are partly attributable to the one or two percent period of time during which the circuitry engages clutch 17 even though the vessel may be idle or stopped. In addition, the possible variation in voltage source may introduce substantial errors. These problems may be overcome largely by the use of more refined circuitry such as that illustrated in FIGS. 5 and 6.

Figure 5:
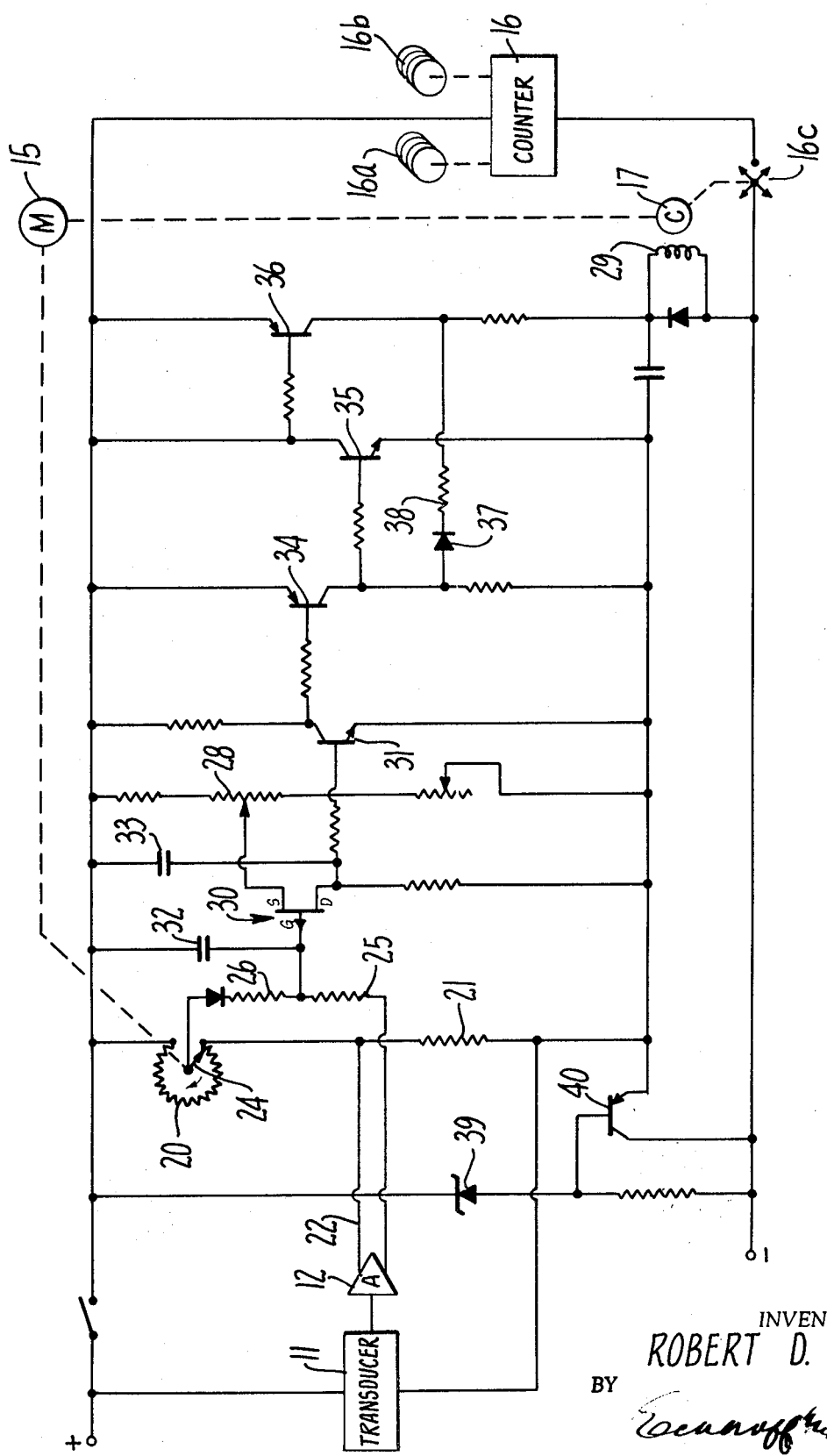
FIG. 5 is a schematic diagram of a third and more sophisticated electrical circuit illustrating a preferred embodiment of the present invention.

Referring to FIG. 5, there is illustrated a circuit which utilizes a condenser 32 connected between the positive end of the voltage source and the grid of the field effect transistor 30. This condenser acts to dampen the short pulse generated by the open potentiometer when the vessel is at rest. A second condenser 33 connected between the positive side of the voltage source and the drain of transistor 30 serves a similar function.

Another feature of the circuit shown in FIG. 5 is the use of an amplification section comprising a series of transistors 34, 35 and 36. A feedback circuit is also provided interconnecting the collector of transistor 34 with the collector of transistor 36, this circuit including a diode 37 and resistor 38. A zener diode 39 operates in conjunction with transistor 40 to provide a voltage regulation for the signal comparison circuit as well as the operating circuit in each stage of amplification. These refinements assure extremely critical and accurate performance such that accuracies of better than plus or minus 1 percent are readily obtainable.

The circuitry of FIG. 5 further distinguishes from that of FIGS. 3 and 4 in that counter 16 comprises a pair of electrical digital indicators 16a and 16b. One indicator is used to give total distance while the other is utilized as a short trip indicator for measuring the distance from one buoy to another. Counter 16 is actuated by a rotary switch 16c which is clutch connected to the synchronous motor 15 by means of clutch 17. The number of contacts and switch 16c is selected so that each contact steps the counter and indicator 16a, 16b forward one number for each tenth of a mile travelled.

FIG. 6 illustrates essentially the same type of operating circuit as shown in FIG. 5. The principal difference is in the type of indicator which is employed and the additional use of an automatic reset system. More particularly, a clock-type indicator 45 comprises a pair of pointers 45a and 45b, each driven by the motor 15 through clutch 17 and gear train 46. In one preferred embodiment, pointer 45a logs 10 miles in one complete revolution while 45b logs 250 miles for each revolution. Hence, the indicator is capable of registering both large distances and small fractions of a mile.

The circuitry illustrated in FIG. 6 further provides an automatic reset system for returning each of the indicator hands 45a and 45b to a zero or home position. This circuitry includes a relay 47 which is activated manually by a reset button 48.

Momentary operation of reset button 48 operates relay 47 closing a holding circuit through a contact 49 and a pair of normally closed microswitches 50 and 51. This circuit also energizes a reset motor 52 as well as the coil 53 for engaging a reset clutch 54, thereby connecting motor 52 so through gearing 55 to indicator 45. A diode 56 is placed in series with motor 52 so that the motor cannot become a generator and hold relay 47 closed after microswitches 50 and 51 are opened.

Energizing relay 47 opens a pair of contacts 57 and 58, disconnecting the emitter of transistor 36 from the positive voltage source, deenergizing coil 29 and disengaging clutch 17. Contact 58 operates in a bypass line across transistor 36 to provide means for energizing coil 29 and engaging clutch 17 for precise positioning of the indicators as hereinafter described.

In operation, microswitches 50 and 51 are associated with and operated by the pointers 45a and 45b, respectively. Microswitch 51 is set or positioned such that it will be opened by the coarse indicator hand 45b when the fine indicating hand 45a reaches the 5-mile point during reset. Microswitch 50 on the other hand is set to open as the indicator hand 45a reaches the exact zero or home position. When both of these conditions exist the holding circuit for relay 47 is broken and contact 50 completes a circuit through the normally closed relay contact 58, energizing coil 29 and engaging clutch 17. This avoids the possibility that inertia forces may move the indicators beyond their zero or home positions. In addition, engaging clutch 17 starts the log or indicator 45 running in the positive direction until the microswitches 50 and 51 again occupy their normally closed positions as shown in the drawing. At this point transistor 36 again becomes operational.

Although preferred embodiments of this invention have been illustrated and described, various modifications and changes may be resorted to without departing from the spirit of the invention or the scope of the appended claims, and each of such modifications and changes as contemplated.

What is claimed is:

1. Apparatus for indicating the distance travelled by a vessel comprising: means for producing an electrical output signal substantially proportional and linear to the velocity of a vessel; means for producing an electrical signal that varies linearly with time between two set values; means for comparing the instantaneous value of said electrical signal with the instantaneous value of said electrical output signal and producing a control signal indicative of the difference between said instantaneous values; a counter; and control means including a control circuit responsive to said control signal for operating said counter in accordance with said difference whereby said counter renders an output indicative of the distance travelled by the vessel.

2. The apparatus of claim 1, said means for producing an electrical signal comprising a potentiometer having a resistance connected between a DC voltage source and a movable contact, means for moving said contact along the resistance from one end to the other in a continuous and repetitive cycling, the position of said contact at any one instant determining the value of the electrical signal.

3. The apparatus of claim 1, said control means for operating said counter comprising a clutch and electrically responsive means connected in said control circuit for engaging and disengaging said clutch.

4. The apparatus of claim 1, the higher of the two set values being substantially equal and opposite to the electrical output signal produced when the vessel moves at its maximum velocity, the lower of the two set values being approximately equal to the electrical output signal produced when the vessel has no velocity.

5. The apparatus of claim 1, said means for producing an electrical signal comprising a potentiometer having a resistance element of substantially 360° connected between a DC voltage source and a movable contact, means connecting said resistance element in series with a second resistance of approximately equal value, and a synchronous motor for rotating said movable contact around said resistance element, the position of said movable contact at any one instant determining the instantaneous value of the electrical signal.

6. The apparatus of claim 5, said means for producing an electrical output signal having an electrical connection between the resistance element of said potentiometer and the second resistance to provide a reference signal equal to the lower of the two set values, said output signal being substantially equal to the reference signal when the vessel has no velocity and becoming relatively lower as the vessel increases in velocity.

7. The apparatus of claim 1, said means for producing an electrical output signal comprising a transducer that produces a first signal that is nonlinear although proportional to the velocity of the vessel and means for modifying said first signal to produce an output signal that is linearly proportional to velocity.

8. Apparatus for indicating the distance travelled by a vessel comprising: means for producing an electrical output signal substantially proportional and linear to the velocity of a vessel; means for producing an electrical signal comprising a potentiometer having a resistance connected between a DC voltage source and a movable contact; means for moving said contact along the resistance from one end to the other in a continuous and repetitive cycling, the position of said contact at any one instant determining the value of said electrical signal; means for comparing the instantaneous value of said electrical signal with the instantaneous value of said output signal; a counter; means for operating said counter comprising a motor, a disengageable clutch connection, electrically responsive means for engaging and disengaging said clutch, and a control circuit for energizing said electrically responsive means; and means for energizing said control circuit with reference to the compared values of said electrical signal and said electrical output signal.

9. The apparatus of claim 8 and further comprising means connecting the resistance of said potentiometer in series with a second resistance of approximately equal value and applying the DC voltage across both resistances, the positive side of the voltage source being connected to one end of the potentiometer resistance and the negative side being connected to the end of the second resistance to establish two set values of electrical potential at opposite ends of the potentiometer resistance, the lower set value being approximately one-half the DC voltage; said means for producing an electrical output signal comprising a modifier having an electrical connection between the potentiometer resistance and said second resistance, the output signal of said modifier being substantially equal to the lower set value when the vessel has no velocity, said signal becoming increasingly lower in comparison to the lower set value as the vessel increases in velocity.

10. The apparatus of claim 8 and further comprising manually controlled circuitry for resetting the counter to zero, comprising a relay having a set of contacts and an energizing coil connected in series with a manually operable, normally open reset switch, one contact of said relay being normally open and connected in a holding circuit for said relay, a second contact of said relay being normally closed and connected in a first energizing circuit for the electrically responsive means, and a third contact of said relay being normally closed and connected in a second energizing circuit for the electrically responsive means; switching means for selectively connecting either said holding circuit or said second energizing circuit to a voltage supply line; said counter having a pointer operative associated with said switching means for deenergizing said holding circuit as the pointer arrives near its zero position while simultaneously connecting the second energizing circuit to the voltage supply line; and means connected to said holding circuit and energized with said holding circuit for operating said counter in reverse, deenergizing said means for operating said counter in reverse, deenergizing said electrically responsive means until the pointer arrives near its zero position, then momentarily energizing said electrically responsive means through the second energizing circuit to accurately position the pointer at its zero position.